United States Patent
Hancock

[15] 3,692,377
[45] Sept. 19, 1972

[54] ELECTRICAL CONNECTION BOX ARRANGEMENT FOR APPLIANCE

[72] Inventor: Charlie L. Hancock, Grove City, Ohio

[73] Assignee: Westinghouse Electric Corporation, Pittsburgh, Pa.

[22] Filed: Jan. 11, 1971

[21] Appl. No.: 105,349

[52] U.S. Cl. ............................................. 312/223
[51] Int. Cl. ....................... A47b 77/08, A47b 81/00
[58] Field of Search .............. 312/223; 220/3.9, 3.92; 248/DIG. 6

[56] References Cited

UNITED STATES PATENTS

| | | | |
|---|---|---|---|
| 2,556,061 | 6/1951 | Buckels | 220/3.92 |
| 3,262,649 | 12/1963 | Mohney | 220/3.92 X |
| 3,462,649 | 8/1969 | Stitch | 312/223 X |

Primary Examiner—Paul R. Gilliam
Attorney—F. H. Henson and E. C. Arenz

[57] ABSTRACT

The subject connection box is formed with two open faces thereon and is mounted to a support leg for the appliance so that the leg closes one of the open faces of the box, while the other open face of the box is closed when the service toe panel is secured to the leg.

5 Claims, 2 Drawing Figures

PATENTED SEP 19 1972  3,692,377

ELECTRICAL CONNECTION BOX ARRANGEMENT FOR APPLIANCE

BACKGROUND OF THE INVENTION

1. Field of the Invention

The invention pertains to the art of electrical connection boxes as applied to appliances.

2. Description of the Prior Art

Electrical connection boxes for dishwashers, with which this invention is particularly concerned although not limited thereto, have typically been formed in the case of the dishwashers of the assignee of this invention as a two piece assembly including a base portion which is secured to a supporting leg of the dishwasher, and a U-shaped cover portion which is in turn secured to the base portion. To obtain access to the connection box, a toe or service panel which usually underlies the door at the front face of the dishwasher must be removed before access may be had to the cover of the connection box. In the prior art arrangement of my assignee, the base part of the cover box is secured to a support leg of the dishwasher by two screws which must be turned from the interior space part of the box outwardly through the support leg to avoid having the sharp screw ends projecting into the interior space of the box where they could lead to shorts. Alternatively, if the screws are driven through the leg and into the box the sharp ends of the screws must be covered to avoid possible abrasion of wiring and shorting.

SUMMARY OF THE INVENTION

In accordance with my invention, an electrical connection box arrangement is provided which I consider to be an improvement over the prior art arrangement. The box is formed out of one piece of sheet metal into a generally rectangularly shaped box in which two faces of the box are open. The box is then secured to an appliance support leg with the support leg closing one of the two open faces, and with the other open face lying in the plane adjacent to that plane occupied by the service panel when the panel is secured to the support legs. Thus, in one of the broader aspects of the invention, a reduction of material for the box is achieved in that the support leg serves as one side closure of the box, and the service panel as another side closure for the box.

Additionally, the box may be constructed with its rear side extending beyond the plane of the side open face so that the extended portion can be placed in abutting relation to the rear leg of a channel typically used for the support leg. Then, a single screw is used to secure that extended portion of the box to the channel. Accordingly, the screw projects into the channel-shaped space of the support leg rather than into the interior space of the box. A projecting lug on the top side of the box, and a cooperating slot in the web of the support leg, is used for a second securement location of the box to the leg.

DRAWING DESCRIPTION

FIG. 1 is a partly broken and partly diagrammatic side view of an undercounter dishwasher to which the invention may be applied, with the general locational relationship of the electrical connection box to the remainder of the dishwasher being illustrated; and FIG. 2 is an exploded, isometric view of the support leg, connection box and service panel before their assembly.

DESCRIPTION OF THE PREFERRED EMBODIMENT

Figure 1:
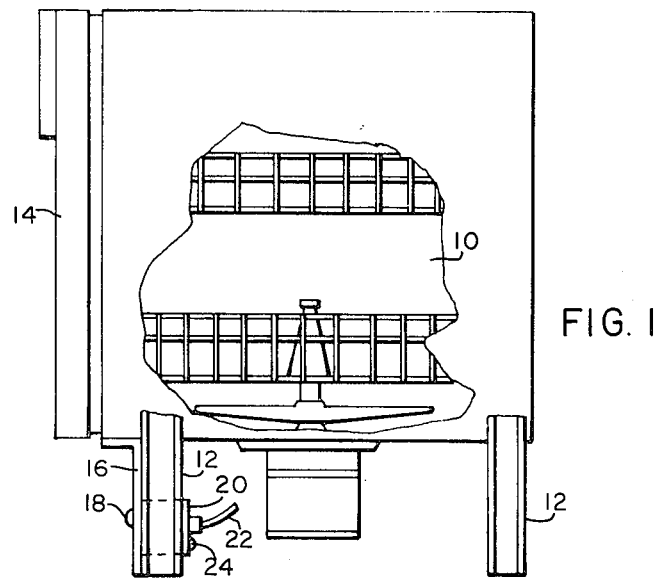

In the somewhat diagrammatic view of FIG. 1, a front opening undercounter dishwasher is illustrated for purposes of explaining one example of the environment in which the electrical connection box arrangement of the invention may be used. The dishwasher tub 10 has attached thereto four support legs 12 which are appropriately secured to the sidewalls of the tub and extend downwardly from the tub adjacent to or at each of the four corners. In most undercounter dishwasher installations the sides of the dishwasher are hidden from view by adjacent base cabinets (not shown) in the kitchen. A finished appearance at the front of the dishwasher is provided by the swing down door 14 and a service or toe panel 16 which is secured to the opposite front support legs 12 by the screw fasteners 18.

The general location of the electrical connection box 20 relative to the front leg 12 and service panel 16 may be seen in FIG. 1. The electrical supply wiring 22 leading to the box is also shown, as well as the single screw 24 which secures the box to the leg 12.

Figure 2:
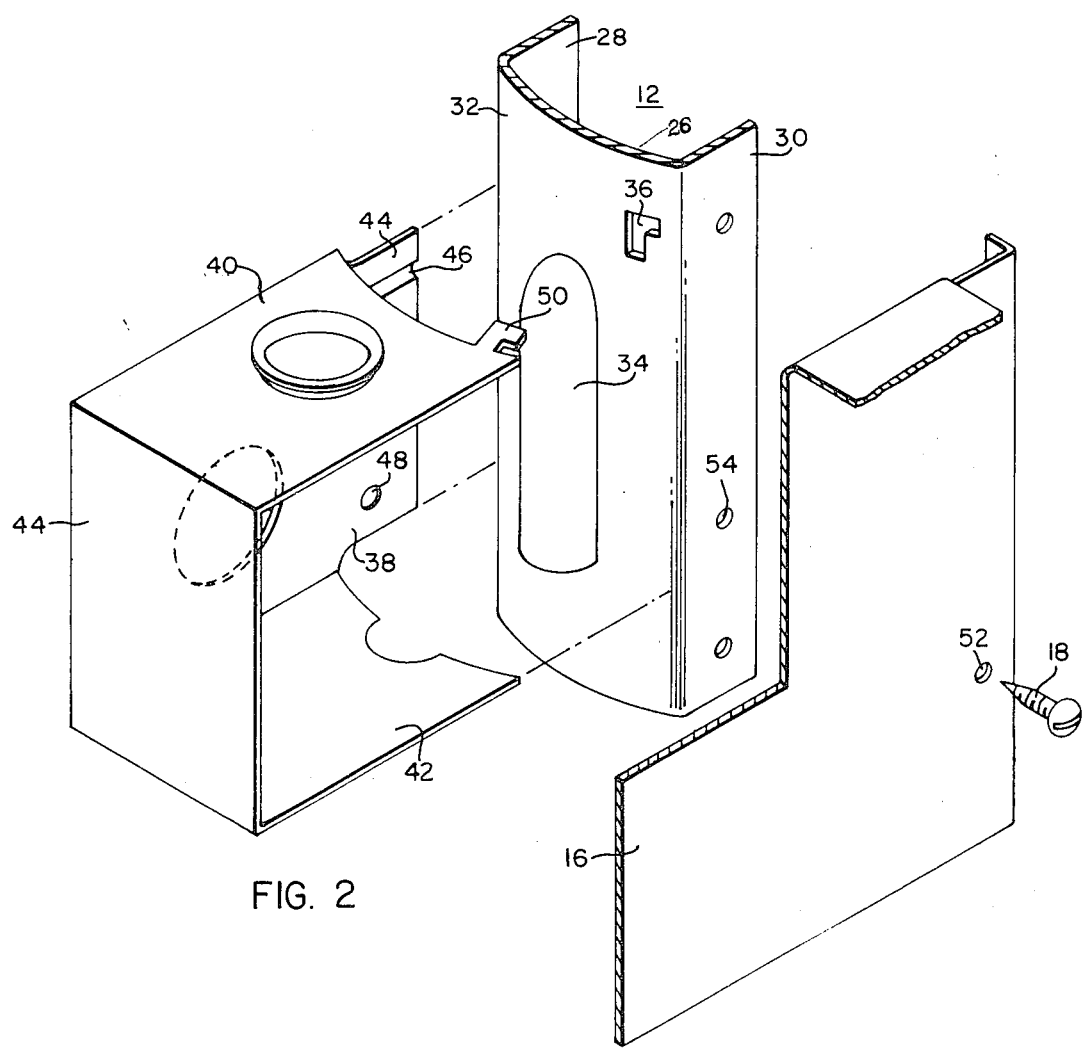

Turning now to FIG. 2, it will be seen that the support leg 12 is of channel-shape cross section and includes a web portion 26, rear flange 28 and front flange 30. The lower end of the support leg 12 has its web portion 26 press formed to present a curved face 32 and a vertically disposed stiffening rib 34 in the center of the curved face. An angle shaped slot 36 is provided in the upper forward curved face 32.

The electrical connection box 20 is formed of a single piece of sheet metal into a box-shaped configuration which includes closed sides on each of the faces except for two. The closed sides of the box include the rear wall 38, top and bottom walls 40 and 42, and side wall 44. The rear wall 38 includes an outwardly-extended portion 44, which also includes two stiffening ribs formed therein (only the upper rib 46 being visible in FIG. 2), and a hole 48 through which the screw 24 (FIG. 1) is driven into an aligned aperture in the rear leg 28 of the support leg 12 when the box is moved in its assembled position. The edge of the top wall 40 facing the support leg 12 is provided with a lug 50 which is received into the slot 36 and hooks behind the web 26 of the leg when the box is assembled to the support leg 12. Both the edges of the top and bottom wall 42 are shaped to conform to the curvature of the curved face 32, and in the case of the lower wall 42 to accommodate the stiffening rib 34 on the web of the support leg 12. The rear wall 38 is provided with an opening through which the electrical supply wiring 22 (FIG. 1) is brought into the interior of the box 20, and the top wall 40 has an aperture through which the wiring leaves the connection box.

It will be appreciated then that when the box 20 is moved into position for assembly to the support leg 12, that the open side face of the box is closed by the web 26 of the support leg. Also, the arrangement is such that the lug 50 in the slot 36, and the single screw 24 (FIG. 1) hold the box into stable position on the support leg 12. Also, the securing screw 24 has its point directed into the interior space of the channel so that it is separated from the interior of the box by the web of the support leg.

After the box is in place on the support leg 12, the forwardly-open face of the box is closed when the service panel 16 is moved into place and secured with the screw 18 passing through the hole 52 in the panel and into the threaded hole 54 provided in the front leg 30 of the support leg 12. Thus when service requires access to the electrical connection box, simple removal of the service panel 16 gives access to the interior of the electrical connection box.

While the invention has been described especially in connection with a dishwasher, it will be appreciated that the concept is applicable to other appliances in which a support member which can serve as one closure side for the box is located in the correct location relative to a service panel to permit the invention to be applied.

I claim:

1. In a washing appliance including at least a pair of support legs adjacent the lower forward corners of the appliance to which a service panel is adapted to be secured, an electrical connection box arrangement comprising:
   a connection box including substantially enclosed sides at all but two faces of said box;
   means for securing said box to one of said support legs in a disposition that said one support leg closes one of said two faces;
   a service panel extending across the total open lower front face of said appliance between said corners, the end portions of said panel being disposed forwardly of said pair of support legs;
   means for detachably securing said service panel to said support legs; and
   said box being so disposed on said one support leg that said other of said open faces lies in a plane that said service panel closes when said panel is secured.

2. In an arrangement according to claim 1 wherein:
   one of said two faces is a side face and the other of said two faces is a front face;
   one of said enclosed sides of said box is the rear side thereof, and said rear side includes an extended portion projecting beyond the plane of said open side face;
   said one support leg includes a rear flange to which said extended portion of said box is secured, and a web for closing said side face of said box.

3. In an arrangement according to claim 2 including:
   means on the top side of said box and on said web of said support leg providing a second securement location of said box to said leg.

4. In an arrangement according to claim 1 wherein:
   said box comprises a member formed from a single piece of sheet metal.

5. In an appliance including a support member located adjacent a service panel access opening defined between opposite side front support legs for said appliance, an electrical connection box arrangement including:
   a connection box having substantially closed sides at all faces except two faces;
   means for securing said box to said support member in a disposition that one of said two faces is closed by said support member, and with the other of said two faces lying in a plane adapted to be closed by a service panel when installed at said access opening;
   a service panel for said access opening; and
   means for detachably securing the opposite ends of said service panel to said opposite support legs, whereby detachment of said service panel exposes the interior of said connection box.

* * * * *